(12) United States Patent
Zandi Pouryan (10) Patent No.: US 10,742,928 B2
(45) Date of Patent: Aug. 11, 2020

(54) INFINITE-RANGE REMOTE CONTROLLED INTERCOM SYSTEM

(71) Applicant: Salahedin Zandi Pouryan, Sanandaj (IR)

(72) Inventor: Salahedin Zandi Pouryan, Sanandaj (IR)

( * ) Notice: Subject to any disclaimer, the term of this patent is extended or adjusted under 35 U.S.C. 154(b) by 0 days.

(21) Appl. No.: 15/854,774

(22) Filed: Dec. 27, 2017

(65) Prior Publication Data

US 2018/0124357 A1    May 3, 2018

(51) Int. Cl.
| | |
|---|---|
| G06F 3/16 | (2006.01) |
| H04M 3/42 | (2006.01) |
| H04N 7/14 | (2006.01) |
| H04N 7/18 | (2006.01) |
| H04M 11/00 | (2006.01) |
| H04M 11/02 | (2006.01) |

(52) U.S. Cl.
CPC ............ *H04N 7/147* (2013.01); *G06F 3/165* (2013.01); *H04M 3/42* (2013.01); *H04M 11/00* (2013.01); *H04M 11/025* (2013.01); *H04N 7/18* (2013.01); *H04M 2242/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0111684 A1* | 5/2008 | Zinser | ................. | G08B 13/196 340/541 |
| 2008/0177856 A1* | 7/2008 | Howard | ................. | G06Q 10/06 709/212 |
| 2009/0058707 A1* | 3/2009 | Craze | ..................... | G08C 17/00 341/176 |
| 2009/0097631 A1* | 4/2009 | Gisby | ..................... | H04M 3/46 379/211.02 |
| 2010/0172484 A1* | 7/2010 | Leung | ..................... | H04M 3/44 379/216.01 |
| 2013/0005399 A1* | 1/2013 | Moran | ................. | H04M 1/0256 455/556.1 |
| 2015/0035987 A1* | 2/2015 | Fernandez | ............ | H04N 7/186 348/156 |
| 2015/0154850 A1* | 6/2015 | Fadell | ................. | G06Q 10/083 340/501 |

* cited by examiner

*Primary Examiner* — Phung-Hoang J Nguyen
(74) *Attorney, Agent, or Firm* — Azadeh Saidi (57) ABSTRACT

The invented system can be utilized as supplementary system for the intercom systems, when the inhabitant does not answer. This system links visitor to the inhabitant regardless of his/her location, via telephone line in activate mode, and provide possibility of remote door opening or telecommunication. The invented system consists of an electronic circuit board, LCD monitor, keypad, SIM card slot and telephone and power ports, which can accompany audio/video door intercom externally or can be used to make a unique indoor intercom and provide ever replying and opening the door possible for the inhabitant from any place.

7 Claims, 7 Drawing Sheets

INFINITE-RANGE REMOTE CONTROLLED INTERCOM SYSTEM

FIELD OF THE INVENTION

Completion and promotion of existing intercom systems is the main concept of invention. Specifically, this system is invented in order to remote control of the intercom systems via telephone lines.

BACKGROUND OF THE INVENTION

The existing door opening systems usually consist of two sections: indoor intercom and outdoor intercom, which are connected with or without wires. In these systems, after ringing doorbell by a visitor, outdoor intercom will be linked to indoor intercom and the inhabitant can have Audio or Audio/Video communication with the visitor, depending on the audio/video features available in the system and can open the door by indoor intercom, if necessary. In the absence of inhabitant, obviously the system lost its capacities. In this case, the visitor usually leaves a note or inquiries about the location and the returning time of the inhabitant from adjacent doors and finally leaves the place without any results. In these systems, the inhabitant will only be informed on visitors when he/she is physically present in the place, Therefore in his/her absence can't be informed on people going to visit him/her.

On the other hands, the necessary of access to indoor intercom makes it difficult for disable or elderly people to use, even while they present at the home.

Other major disadvantage of these systems is the shortage of security level of the estate, because when a thief rings the doorbell and doesn't receive a reply, it ensures him/her that nobody presents and the estate is empty.

SUMMARY OF THE INVENTION

The invented system as a supplementary for existing intercom systems, resolves many current problems.

This system is applied when the inhabitant does not present in the place or cannot access to the indoor intercom. In this case, after ringing the doorbell by a visitor, the inhabitant will be aware of him/her from any location, and communicates with the visitor by telephone and command to open the door from his/her location. Hence the invented system makes usually replying and opening the door possible for the inhabitant from any place at any time. This system also warns the visitor that he/she is contacting the inhabitant by telephone, this results solving security problems in current systems by putting the inhabitant in picture on presence of a visitor at the estate door.

To increase the probability of a secure communication between the visitor and the inhabitant three call number can be saved including Public switched, global system mobile and international telephone line. The system has choices to select other numbers whenever the one is busy or there is no connection. The system is contacting via public switched telephone network (PSTN). If PSTN doesn't support there, global System for mobile communication (GSM) can be used by SIM card.

Other remote control features like time limited call waiting, extended waiting time, time limited call, extending call period, door opening and also door locking (in case of using special door-lock system), have been provided which can be performed on inhabitant telephone's keypad.

The invented system will be introduced in current patent, in two sections: an external optional telephone line intercom control device and the unique indoor intercom equipped with telephone line controller, which beside of previously mentioned advantages, have their individual benefits. External telephone line door control device is capable to add to all kinds of existing audio/video door intercom systems, before or after installation of intercom system. Existing intercom systems will be changed to more efficient ones in absence or presents of inhabitant by adding this small external device at low cost and energy without any interference in their previous functions.

The unique indoor intercom equipped with the invented control system, changes current intercom systems to more efficient and complete systems without adding a new device. It deducts occupied space, wiring quantities and electronics parts, in comparison with external telephone line intercom control device. It is noteworthy that invented system can be deactivated easily from intercom systems at any time.

DESCRIPTION OF DRAWINGS

FIG. 5.A illustrates the first part of invented system's function process.

FIG. 5.B illustrates the second part of invented system's function process.

FIG. 5.C illustrates the third part of invented system's function process.

DETAILED DESCRIPTION OF THE INVENTION

Figure 1:
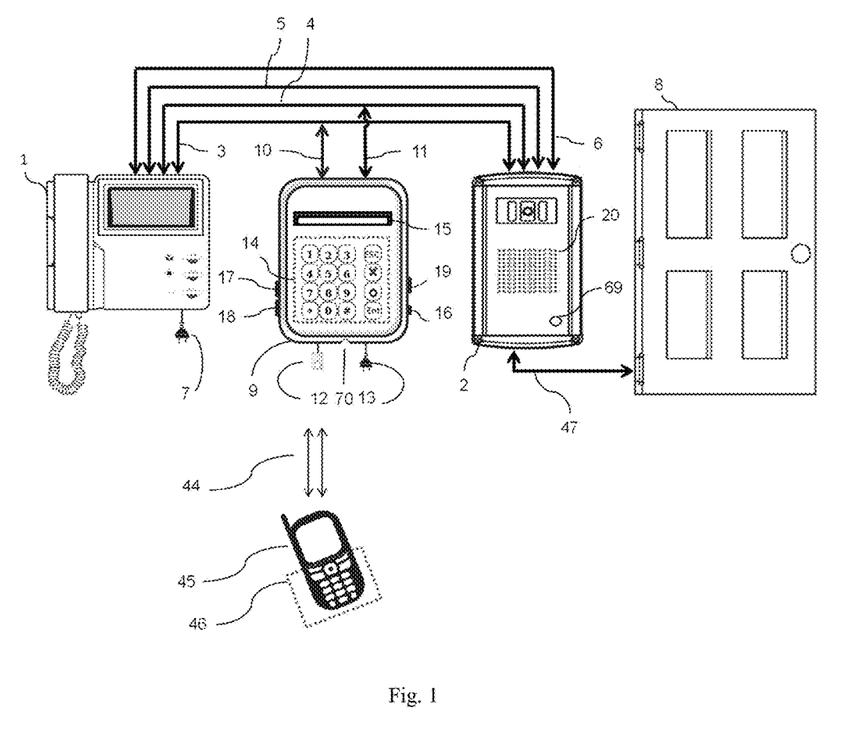
FIG. 1 shows a common system of a video intercom which the invented system is extended to it, externally.

According to FIG. 1 Indoor intercom (1), outdoor intercom (2), four wires D/V (3), ground wire (4), video cable (5) and power supply cable (6), organize a common video intercom system, which is connected to power outlet by (7) and can open door (8). By adding invented device (9), modification and improvement of the system can be achieved. Wires (10) (11) exit out of main board of invented device (9).

After connecting them to D/V (3) and ground wire (4) of common intercom, the telephone socket (12) will be connected to public switched telephone network (PSTN) (or put a SIM card to SIM card slot (70) and therefore connected to global System for mobile communication (GSM), if PSTN doesn't support there) and later will be plugged into (13) city power outlet.

The invented system will be attached to a common video intercom system and then the inhabitant will be ready to enter three different telephone numbers (Public switched, global system mobile and international telephone line) to memory by keypad (14) and LCD monitor (15). Switch (16) to making the device active or inactive and tuners (17, 18 and 19) to control the volume of receiving sound are contrived on the device (the applications of the tuners will be described later according to FIG. 5).

Figure 2:
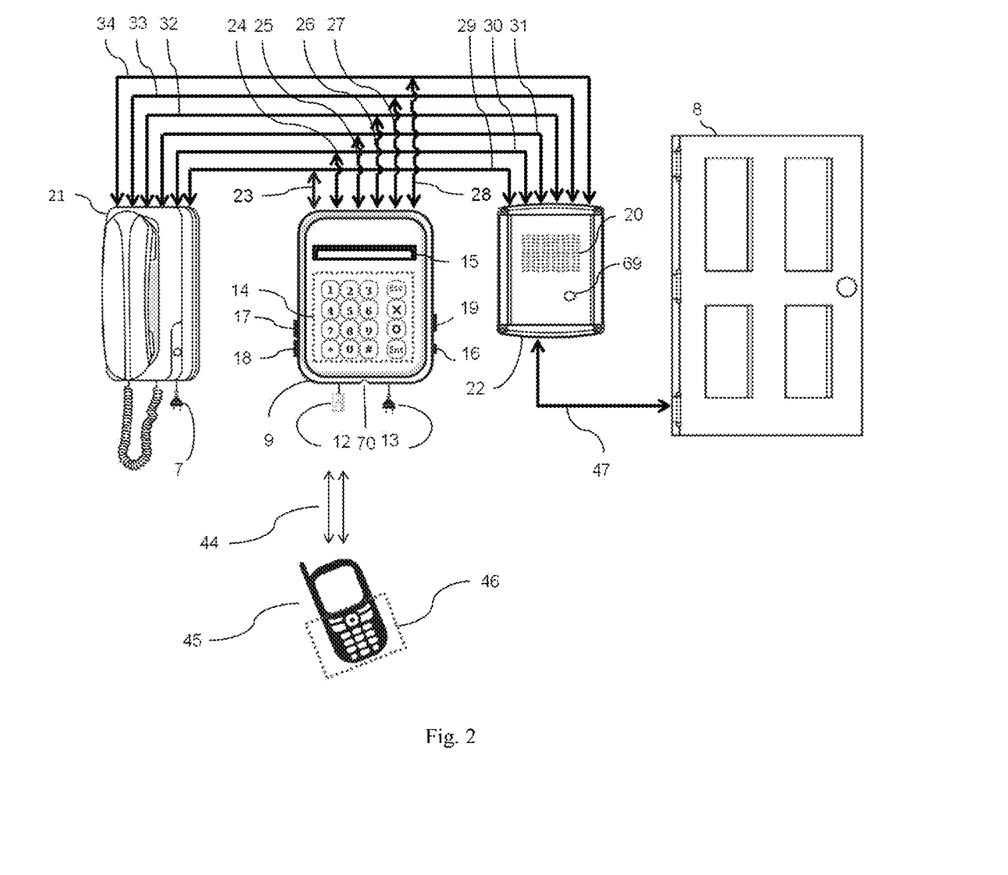
FIG. 2 shows a common system of an audio intercom which equipped with the invented system, externally.

At the audio intercom system as it can be seen in FIG. 2, the invented device (9) located between indoor intercom (21) and outdoor intercom (22). In such case, six wires (23, 24, 25, 26, 27 and 28) are branched from main board and joined to wires C (common wire or GND) (29), cables (A and B) (audio transmission) (30 and 31), wire D (32) for ringing control and (E and F) (33, 34) for door-lock operation.

Figure 3:
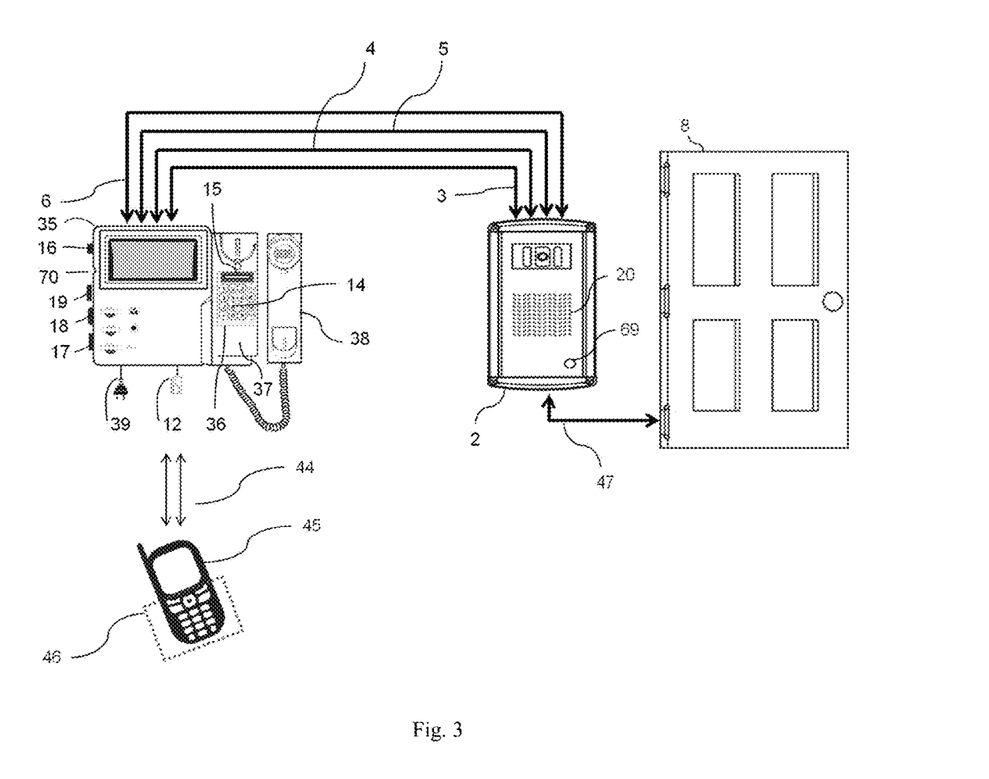
FIG. 3 shows a system of a video intercom with the unique indoor intercom equipped with the invented control system.

In FIG. 3, indoor intercom (35) is illustrated which is a unique invented intercom. In this system, keypad (14) and LCD monitor (15) are placed into cell (36) considered on section (37) of the device body, so this set is observable when hand set (38) is taken off. Connection point to telephone line (PSTN) (12), SIM card slot (70), activation switch (16) and tuners (17, 18, and 19) also are seen in the Figure.

The connection between indoor intercom (35) and outdoor intercom (2) is made by four wires D/V (3), GND wire (4), video cable (5) and power supply (6). The interaction between the main board of invented system and other components inside of hand set compartment is the same as external type explained according to FIG. 1 by two wires (3) and (4); the only deference is that the connector wires are located inside of intercom (35) which lead to deduction of necessary wiring, space and electronics elements and circuits. The desired power also is provided by connection (39).

This system also is applicable in an audio intercom and changes it to a unique audio intercom with remote control features. As it can be seen in FIG. 4 and similar to the introduced model through FIG. 3, a set of keypad (14) and LCD monitor (15) is located inside of cell (40) in section of (41) of device body, under the hand set (43). Activation switch (16), tuners (17, 18, and 19), PSTN connector socket (12), SIM card slot (70) and power supply connection plug (39) also can be seen in the figure, just like other models.

Figure 4:
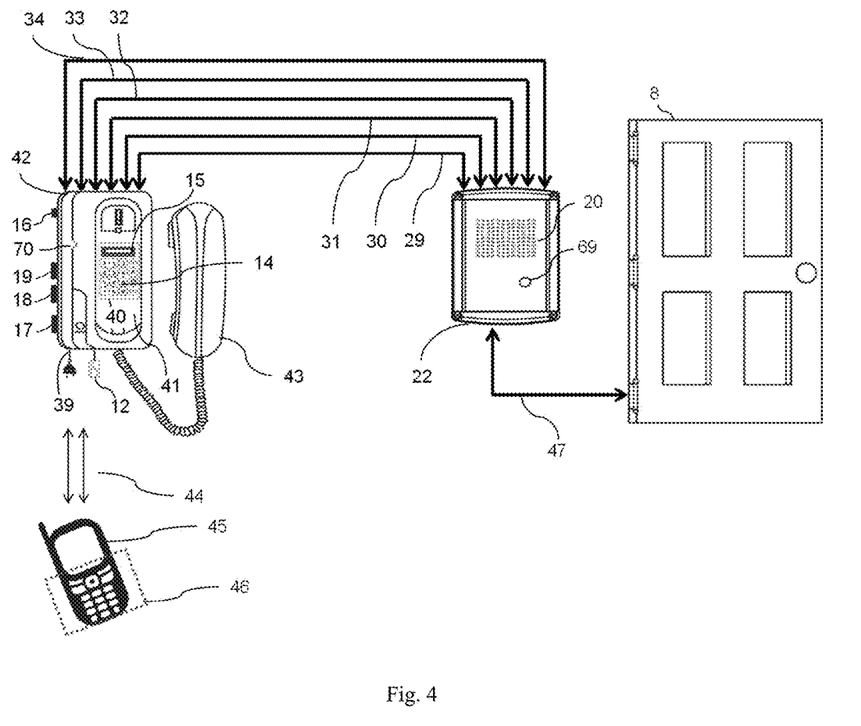
FIG. 4 shows a system of an audio intercom with the unique indoor intercom equipped with the invented control system.
Figure 5A:
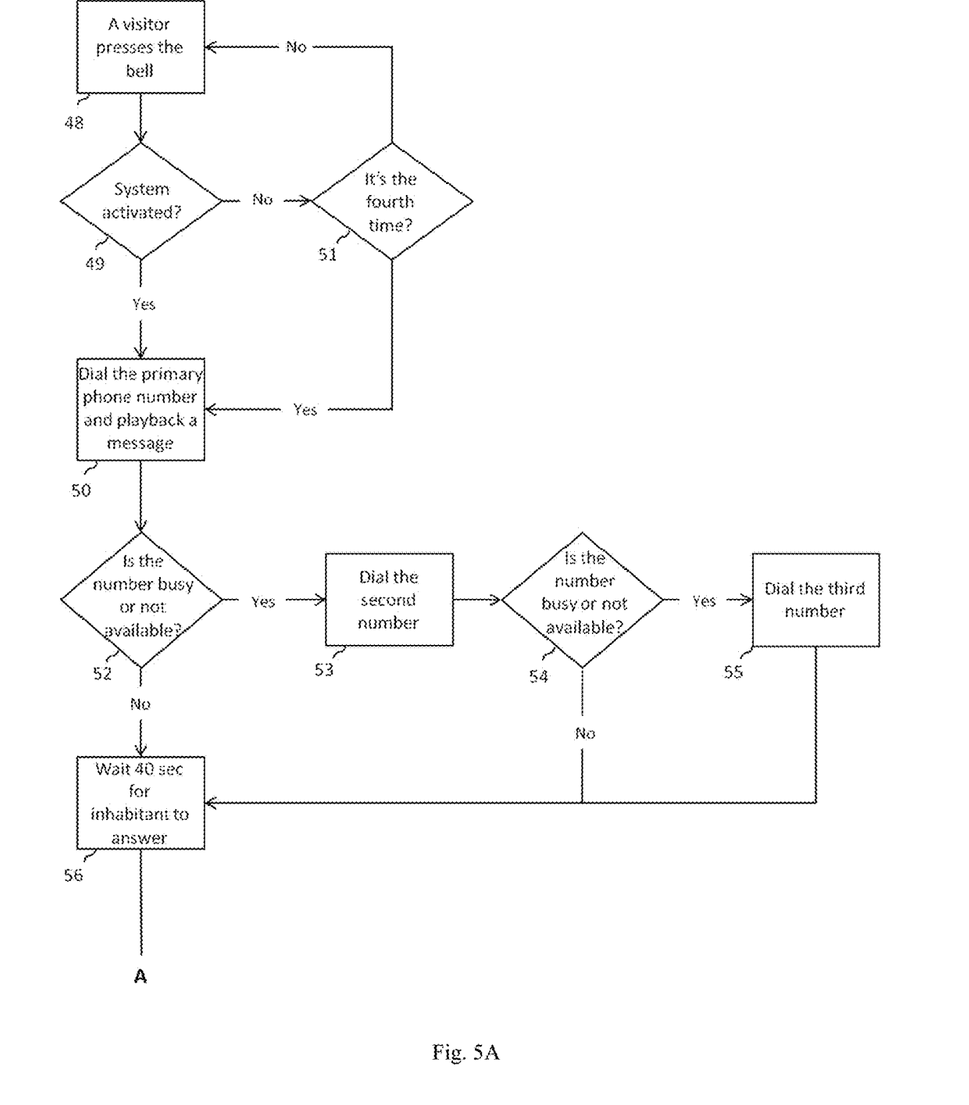
Figure 5B:
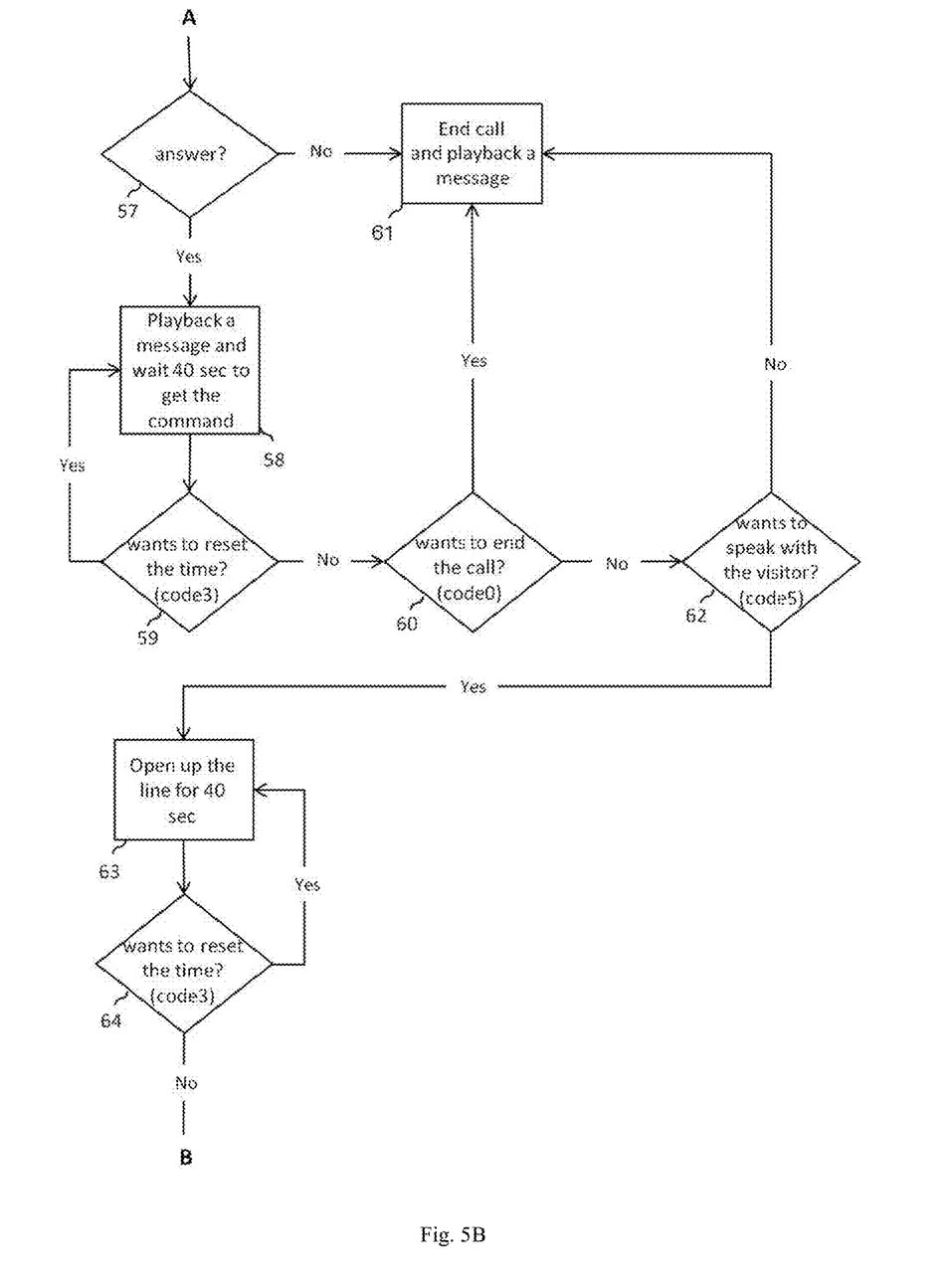
Figure 5C:
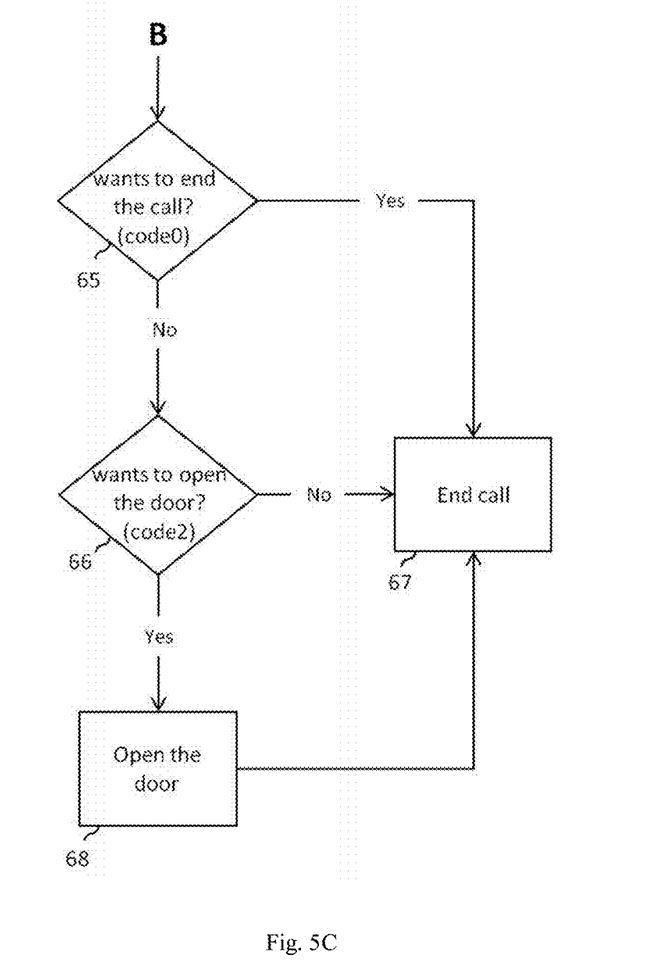

After installation of the system in all of described models according to FIGS. 1 to 4 and setting the device by the inhabitant with keypad (14) and LCD monitor (15), now the functions of the system can be explained in FIG. 5. At block (48), in all models, the visitor press the bell ((69) in FIGS. 1 to 4) on outdoor intercom ((2) in FIGS. 1 and 3, (22) in FIGS. 2 and 4).

At block (49), if the system is activated by switch (16) (in FIGS. 1 to 4), it will dial the primary telephone number saved in memory through PSTN that is linked to the system by connector (12) (in FIGS. 1 to 4) (or through GSM that is linked to the system by the SIM card that is being placed in slot (70)), at block (50). A recorded message will playback through speaker (20) (in FIGS. 1 to 4) to let the visitor know that the system is going to contact with the inhabitant. It's noteworthy that the sound volume level of playback of saved messages has been set by the inhabitant in advance by tuner (19).

If the system is not in an active mode, after fourth time of ringing, dialing and playing the message back will be finished at block (51). As mentioned before, to raise the probability of secure connection with the inhabitant, three telephone numbers, can be saved in the memory and contacting to inhabitant's phone (45) (in FIGS. 1 to 4) will be done via telephone line (42) (in FIGS. 1 to 4). At block (52), if the dialed number is busy or not available, the second number will be dialed at block (53), and same procedure at block (54) for the third one at block (55).

After dialing of the third number, or in the case of availability of first and second numbers, at block (56), the system will wait 40 seconds for inhabitant response. At block (57), if the inhabitant doesn't answer, the connection will be interrupted at block (61), and a saved message will be played back for the visitor via speaker (20) (in FIGS. 1 to 4) in this regard.

If the inhabitant replies at block (57), a saved message will be played back for the inhabitant and inform him/her to establish the connection to the intercom system, at block (58). More over the inhabitant will be able to command by keypad (46) (in FIGS. 1 to 4) within 40 seconds. At block (59), the inhabitant can extend that period to a next 40 seconds by pressing key number 3 on his/her phone's keypad (46) (in FIGS. 1 to 4).

At block (60), he/she will be able to terminate the connection by pressing key 0 (or its phone's end call button) and at block (62) it will be possible talking with the visitor by pressing key 5. Pressing key 5 at block (63) opens up the line between inhabitant telephone (45) (in FIGS. 1 to 4) and outdoor intercom ((2) in FIGS. 1 and 3 and (22) in FIGS. 2 & 4) for a 40 seconds period, and the inhabitant and the visitor can talk to each other.

It is noted that during the conversation, the volume of receiving sound from phone (45) (in FIGS. 1 to 4) has been already adjusted by inhabitant through tuner (17) (in FIGS. 1 to 4) and the same for sound from speaker (20) (in FIGS. 1 to 4) through tuner (18) (in FIGS. 1 to 4). At block (64) the inhabitant can extended calling period for a next 40 seconds by pressing key 3. At block (65), after the conversation, the inhabitant is able to terminate contact at block (67) by key 0 (or its phone's end call button).

Furthermore at block (66), an opening signal will be provided for outdoor intercom ((2) in FIGS. 1 and 3 and (22) in FIGS. 2 and 4) by pressing key 2 and the system can open the door (8) from a long distance in sequence of the inhabitant command by link (47) which is available between outdoor intercom and door lock in all intercom systems (block 68).

The invention claimed is:

1. An infinite-Range Remote controlled intercom system; comprising:

A main control system;

A video intercom system, having an indoor intercom system and an outdoor intercom system;

Wherein said main control system is connected via wires to said video intercom system, connecting said indoor intercom system to said outdoor intercom system; wherein said main control system comprises a keypad for entering numbers and/or words to a memory of said main control system; an LCD monitor and a switch for activating or inactivating said system; multiple tuners control a volume of receiving sound; a telephone line (PSTN) and a SIM card slot; wherein when a visitor rings a bell on said outdoor intercom: said main control unit dials one of said three preprogrammed numbers stored in said memory; when a first number is busy or not available a second number is dialed; and when said second number is also busy or not answered then a third number is dialed; after a predetermined response time when no connection to said owner is made; a saved and prerecorded message will be played back for said visitor via said speaker; wherein when said owner answers any of said first, second and third numbers; a different prerecorded voice message is played back for said owner and inform him/her to establish a connection to said main control unit; wherein said owner has said predetermined response time to command said main control unit, however said owner extends this predetermined response by pressing an extension time key on their own phone/mobile device before said predetermined response time ends and increase said response time as long as he/she needs.

2. The system of claim 1; wherein said main control system is programmed to receive three different phone numbers; public switched, global system mobile and international telephone line; in its said memory by said keypads.

3. The system of claim 2, wherein said outdoor intercom is an audio or a video intercom, and said indoor intercom is also be an audio or a video intercom; wherein said main control system is a separate unit from said indoor and outdoor intercoms, or is installed and predesigned into said indoor intercom comprising all of aforementioned features described earlier.

4. The system of claim 3; wherein when said main control intercom is active; when an outdoor intercom is activated by ringing a door bell, said main control unit will dial a primary number saved in said memory through PSTN through said telephone line, or through GSM by a SIM card that is placed inside said SIM card slot; and a prerecorded voice message is played via a speaker from said outdoor intercom letting a visitor know that the owner is being contacted.

5. A method of remote controlling an outdoor intercom, comprising the steps of:

Installing a main control unit as a standalone or as part of an indoor intercom system at a desired location; wherein said main control unit comprises a keypad for entering numbers and/or words to a memory of said main control system; an LCD monitor and a switch for activating or inactivating said system; multiple tuners control a volume of receiving sound; a telephone line (PSTN) and a SIM card slot; then programming three numbers of an owner of said desired location into said main control unit; wherein when a visitor rings a bell on said outdoor intercom; said main control unit dials one of said three preprogrammed numbers stored in said memory; when a first number is busy or not available a second number is dialed; and when said second number is also busy or not answered then a third number is dialed; after a predetermined response time when no connection to said owner is made; a saved and prerecorded message will be played back for said visitor via said speaker; wherein when said owner answers any of said first, second and third numbers; a different prerecorded voice message is played back for said owner and inform him/her to establish a connection to said main control unit; wherein said owner has said predetermined response time to command said main control unit, however said owner extends this predetermined response an extension time key on their own phone/mobile device before said predetermined response time ends and increase said response time as tong as he/she needs.

6. The method of claim 5, wherein said owner ends said connection by pressing key zero or end call button on their said phone/mobile; or talks with said visitor by simply pressing key 5 on their said phone/mobile device.

7. The method of claim 6, wherein said owner sends an opening signal to said outdoor intercom by pressing key 2 on their said phone/mobile device; therefore said main control system will send a signal to said outdoor intercom to open a door for said visitor.

* * * * *